United States Patent
Yu (10) Patent No.: US 11,574,197 B2
(45) Date of Patent: Feb. 7, 2023

(54) METHOD AND APPARATUS FOR SEISMIC IMAGING PROCESSING WITH ENHANCED GEOLOGIC STRUCTURE PRESERVATION

(71) Applicant: China Petroleum & Chemical Corporation, Beijing (CN)

(72) Inventor: Jianhua Yu, Houston, TX (US)

(73) Assignee: China Petroleum & Chemical Corporation, Beijing (CN)

( * ) Notice: Subject to any disclaimer, the term of this patent is extended or adjusted under 35 U.S.C. 154(b) by 434 days.

(21) Appl. No.: 16/730,440

(22) Filed: Dec. 30, 2019

(65) Prior Publication Data

US 2020/0210846 A1 Jul. 2, 2020

Related U.S. Application Data

(60) Provisional application No. 62/786,279, filed on Dec. 28, 2018.

(51) Int. Cl.
*G01V 1/28* (2006.01)
*G06N 3/08* (2006.01)

(52) U.S. Cl.
CPC ............ *G06N 3/084* (2013.01); *G01V 1/282* (2013.01); *G01V 2210/51* (2013.01); *G01V 2210/614* (2013.01); *G01V 2210/67* (2013.01)

(58) Field of Classification Search
CPC ........ G06N 3/084; G01V 1/282; G01V 1/302; G01V 1/28; G01V 2210/51; G01V 2210/614; G01V 2210/67; G01V 2210/512; G01V 2210/64; G01V 2210/679; G06K 2009/6237; G06K 15/1223

See application file for complete search history.

(56) References Cited

U.S. PATENT DOCUMENTS

| | | | | |
|---|---|---|---|---|
| 10,088,588 B2 * | 10/2018 | Zhang | ................... | G01V 1/301 |
| 2014/0301158 A1 * | 10/2014 | Zhang | ................... | G01V 1/301 367/7 |

FOREIGN PATENT DOCUMENTS

| | | | | |
|---|---|---|---|---|
| CN | 104020492 B | * | 10/2015 | |
| CN | 105608679 A | * | 5/2016 | ............. G06T 5/002 |
| CN | 108230274 A | * | 6/2018 | |

OTHER PUBLICATIONS

P. Williamson and et al, "Regularization of Wave-Equation Migration Velocity Analysis by Structure-Oriented Smoothing", 2011 SEG Annual Meeting, San Antonio, Texas, Sep. 2011 (Year: 2011).*

* cited by examiner

*Primary Examiner* — Douglas Kay (74) *Attorney, Agent, or Firm* — Novick, Kim & Lee, PLLC; Allen Xue (57) ABSTRACT

A method for seismic processing includes steps of seismic signal forward propagation and seismic data back propagation. The subsurface medium image is created after correlating and summarizing forward and backward propagation results. To address migration footprint and noise due to the incomplete data acquisition aperture and migration approximation in the migration operator, the iteration inversion strategy incorporates tensor flow calculated from seismic image. A regularization operator based on structure tensor of image is applied to seismic image inversion.

7 Claims, 5 Drawing Sheets

METHOD AND APPARATUS FOR SEISMIC IMAGING PROCESSING WITH ENHANCED GEOLOGIC STRUCTURE PRESERVATION

CROSS-REFERENCE TO RELATED APPLICATION

This application claims priority to U.S. Provisional Patent Application having Ser. No. 62/786,279, filed on Dec. 28, 2018, which is incorporated herein by reference in its entirety.

FIELD OF TECHNOLOGY

The present disclosure relates generally to a method for collecting and processing seismic data as well as seismic acquisition design. More specifically, the present disclosure provides methods and devices for enhanced seismic image enhancement with structure tensor and total variation regularization.

BACKGROUND

Seismology is used for exploration, archaeological studies, and engineering projects that require geological information. Exploration seismology techniques are extensively used in oil and gas exploration to identify prospects and types of geologic formations. In a seismic survey a seismic wave is sent into the ground and the seismic wave echoed from subsurface formations to the surface are recorded by receivers, i.e., geophones. The seismic waves are created by an energy source, for example, small explosions or seismic vibrators on land, or air guns or vibrators in marine environments. Multiple energy sources and receivers are placed at various locations near the surface of the earth above a geologic structure of interest. A seismic survey is composed of a very large number of individual seismic recordings or traces that create a near continuous profile of subsurface.

By analyzing the time it takes for the seismic waves to reflect off of subsurface formations and return to the surface recorded in these traces, a geophysicist can map subsurface formations and anomalies and predict where oil or gas might be trapped in sufficient quantities for exploration activities. A two-dimensional (2D) seismic survey is conducted along a single line on the ground, and their analysis creates a two-dimensional cross section picture akin to a vertical slice through the earth beneath that line. In a three dimensional (3D) survey, the source and recording locations are distributed in a grid pattern. The analysis of a 3D data shows a 3D picture of the subsurface geology beneath the survey area.

The process that maps the seismic traces to subsurface interfaces is known as migration. Migration takes seismic data collected in the field and moves the reflection events back to their origin at the subsurface interface. Reverse time migration (RTM) is a migration method where the reflection traces are reversed in time when doing propagation as the source-time history at each geophone. These geophones now act as sources of seismic energy and the fields are back-propagated into the earth medium. Two-way wave equation based RTM (Equation 1) has become a standard imaging algorithm for challenging imaging areas with complex structures associated with large velocity variations and steep dips. The image of RTM is constructed by taking the zero-lag cross-correlation of source and receiver wavefields.

Seismic migration can be casted mathematically as m'=G^Td, in which d is seismic data acquired in the field; m' is estimated subsurface structure image model; G^T is migration propagation engine that is approximated as an inverse operator or an adjoint operator of seismic wavefield forward propagation engine G.

In the case of forward propagation, the data d can be expressed as d=Gm, in which G is the forward modeling engine. m is true image model or true earth reflectivity model.

After certain mathematical manipulations, the relationship between estimated subsurface model and true model can be expressed as follows m'=(G^TG)m. It is noted that, if the product of migration operator and forward propagation operator is not identity, the subsurface model m' estimated from migration is not exactly same as true model m. That means that the migration image model m' is actually a polluted vision of the true reflectivity model m.

The two-way acoustic wave equation can be expressed as $$\frac{\partial^2 u}{\partial^2 t} - v^2\left(\frac{\partial^2 u}{\partial^2 x} + \frac{\partial^2 u}{\partial^2 y} + \frac{\partial^2 u}{\partial^2 z}\right) = F \qquad (1)$$

in which v is velocity; F is source signal; and u is wavefield. Equation (1) assumes the density of the medium to be constant.

To accomplish the goal of mitigating the distortion by blurring operator (G^TG), the inversion strategy can be expressed mathematically as follows:

$$J = \|Gm - d\|^2 + \|Cm\|^2 \qquad (2),$$

in which C is constraint matrix which acts as regularization operator.

The optimized reflectivity model m can be obtained by solving normal equation in regularized least squares sense, as shown in Equation (2) below:

$$m = [G^T G + C^T C]^{-1} G^T d \qquad (3),$$

in which T denotes the adjoint operation to the forward modeling operator.

Inverted m directly solving the system described in Equations (2) and (3) is a constrained least squares estimate. Equation (3) can be solved by different optimization algorithm, such as non-linear conjugate gradient algorithm. Using above inversion strategy to estimate subsurface model m help to attenuate migration noise and to correct seismic data amplitude distortion.

It is noted that the inversion problem described above is extremely ill-conditioned. In a large equation system, where the number of unknowns is numerous, the least squares estimate is very sensitive to the errors (noise) present in the observed data d. Oftentimes direct inversion of m may not lead to a stable and reliable solution.

To address the ill-posed nature of least squares migration problem, a large variety of techniques have been developed, most of which are under the regularization using L1 norm, Tikonov, and total variation frameworks, etc. The key idea of the regularization approach is that the a priori knowledge is expressed by regularization term or penalty term. However, the state-of-the-art fails to resolve the ill-posed nature of the inversion problem. Accordingly, new methods are needed to improve migration image with attenuation of noise and enhancement of signal while preserving the geology structure.

SUMMARY

This disclosure provides a method for seismic processing includes steps of seismic signal forward propagation and seismic data back propagation. The subsurface medium image is created after correlating and summarizing forward and backward propagation results. To address migration footprint and noise due to the incomplete data acquisition aperture and migration approximation in the migration operator, the iteration inversion strategy incorporates tensor flow calculated from seismic image. Further, a regularization operator based on structure tensor of image is applied to seismic image inversion.

In one embodiment of this disclosure, a method for seismic processing includes the steps of receiving seismic data acquired from a plurality of seismic receivers and a plurality of seismic sources in a subterranean area; creating an image model by migration in time or in depth using a two-way acoustic wave equation from the seismic data; and updating the image model.

The step of updating the image model further include the substeps of calculating forward wave propagation using the two-way acoustic wave equation to create synthetic data using a current image model; comparing the synthetic data and the received seismic data; when a difference between the synthetic data and the received seismic data exceeds a pre-determined value, calculating a total variation regularization operator and structure tensor regularization operator using the current image model; computing wavefield back-propagation and constructing a new gradient with the calculated structure tensor operator and the total variation regularization operation; and obtaining an update of the current image model.

This disclosure further provides a computing apparatus that has one or more processors and a memory system comprising one or more non-transitory, computer-readable media storing instructions that, when executed by at least one of the one or more processors, cause the computing system to perform operations. The operations include receiving seismic data acquired from a plurality of seismic receivers and a plurality of seismic sources in a subterranean area; creating an image model by migration in time or in depth using a two-way acoustic wave equation from the seismic data; and updating the image model.

The step of updating the image model further include the substeps of calculating forward wave propagation using the two-way acoustic wave equation to create synthetic data using a current image model; comparing the synthetic data and the received seismic data; when a difference between the synthetic data and the received seismic data exceeds a pre-determined value, calculating a total variation regularization operator and structure tensor regularization operator using the current image model; computing wavefield back-propagation and constructing a new gradient with the calculated structure tensor operator and the total variation regularization operation; and obtaining an update of the current image model.

The disclosure also provides a non-transitory, computer-readable medium storing instructions that, when executed by at least one processor of a computing apparatus, cause the computing system to perform operations. The operations includes the steps of receiving seismic data acquired from a plurality of seismic receivers and a plurality of seismic sources in a subterranean area; creating an image model by migration in time or in depth using a two-way acoustic wave equation from the seismic data; and updating the image model.

The step of updating the image model further include the substeps of calculating forward wave propagation using the two-way acoustic wave equation to create synthetic data using a current image model; comparing the synthetic data and the received seismic data; when a difference between the synthetic data and the received seismic data exceeds a pre-determined value, calculating a total variation regularization operator and structure tensor regularization operator using the current image model; computing wavefield back-propagation and constructing a new gradient with the calculated structure tensor operator and the total variation regularization operation; and obtaining an update of the current image model.

In certain embodiments, the total variation regularization operator is $\nabla TV(m) = -\nabla \cdot (\nabla m / |\nabla m|)$, in which m is the current image model.

In other embodiments, the structure tensor regularization operation is $\nabla STS(m) = \text{div}(H\nabla m)$, in which H is a structure tensor based diffusion function and div is divergence operator.

In further embodiments, the substep of computing wavefield back-propagation and constructing a new gradient with the calculated structure tensor operator and the total variation regularization operator is performed by calculating a derivative of ∂J/∂m, in which $$J = \|Gm - d\|^2 + \tfrac{1}{2}\|TV(m)\|_p + \tfrac{1}{2}\|STS(m)\|_p,$$

while $\|\cdot\|$ represents L2 norm, d is the received seismic data, and p is a norm that ranges from 1 to 2. In a further embodiment, wherein the substep of obtaining an update of the current image model is carried out by solving the equation above according to one or more optimization methods.

DETAILED DESCRIPTION

The present disclosure provides a method involving steps that may be described and implemented in the general context of a system and computer methods to be executed by a computer. Such computer-executable instructions may include programs, routines, objects, components, data structures, and computer software technologies that can be used to perform particular tasks and process abstract data types. Software implementations of the present disclosure may be coded in different languages for application in a variety of computing platforms and environments. It will be appreciated that the scope and underlying principles of the present disclosure are not limited to any particular computer software technology.

Moreover, those skilled in the art will appreciate that the present disclosure may be practiced using any one or combination of hardware and software configurations, including but not limited to a system having single and/or multiple computer processors, hand-held devices, programmable consumer electronics, mini-computers, mainframe computers, and the like. The disclosure may also be practiced in distributed computing environments where tasks are performed by servers or other processing devices that are linked through a one or more data communications network. In a distributed computing environment, program modules may be located in both local and remote computer storage media including memory storage devices.

The Figures (FIG.) and the following description relate to the embodiments of the present disclosure by way of illustration only. It should be noted that from the following discussion, alternative embodiments of the structures and methods disclosed herein will be readily recognized as viable alternatives that may be employed without departing from the principles of the claimed disclosures.

Referring to the drawings, embodiments of the present disclosure will be described. Various embodiments can be implemented in numerous ways, including for example as a system (including a computer processing system), a method (including a computer implemented method), an apparatus, a non-transitory computer readable medium, a computer program product, a graphical user interface, a web portal, or a data structure tangibly fixed in a non-transitory computer readable memory. Several embodiments of the present disclosure are discussed below. The appended drawings illustrate only typical embodiments of the present disclosure and therefore are not to be considered limiting of its scope and breadth.

Reference will now be made in detail to several embodiments of the present disclosure(s), examples of which are illustrated in the accompanying figures. It is noted that wherever practicable similar or like reference numbers may be used in the figures and may indicate similar or like functionality. The figures depict embodiments of the present disclosure for purposes of illustration only. One skilled in the art will readily recognize from the following description that alternative embodiments of the structures and methods illustrated herein may be employed without departing from the principles of the disclosure described herein.

Figure 1:
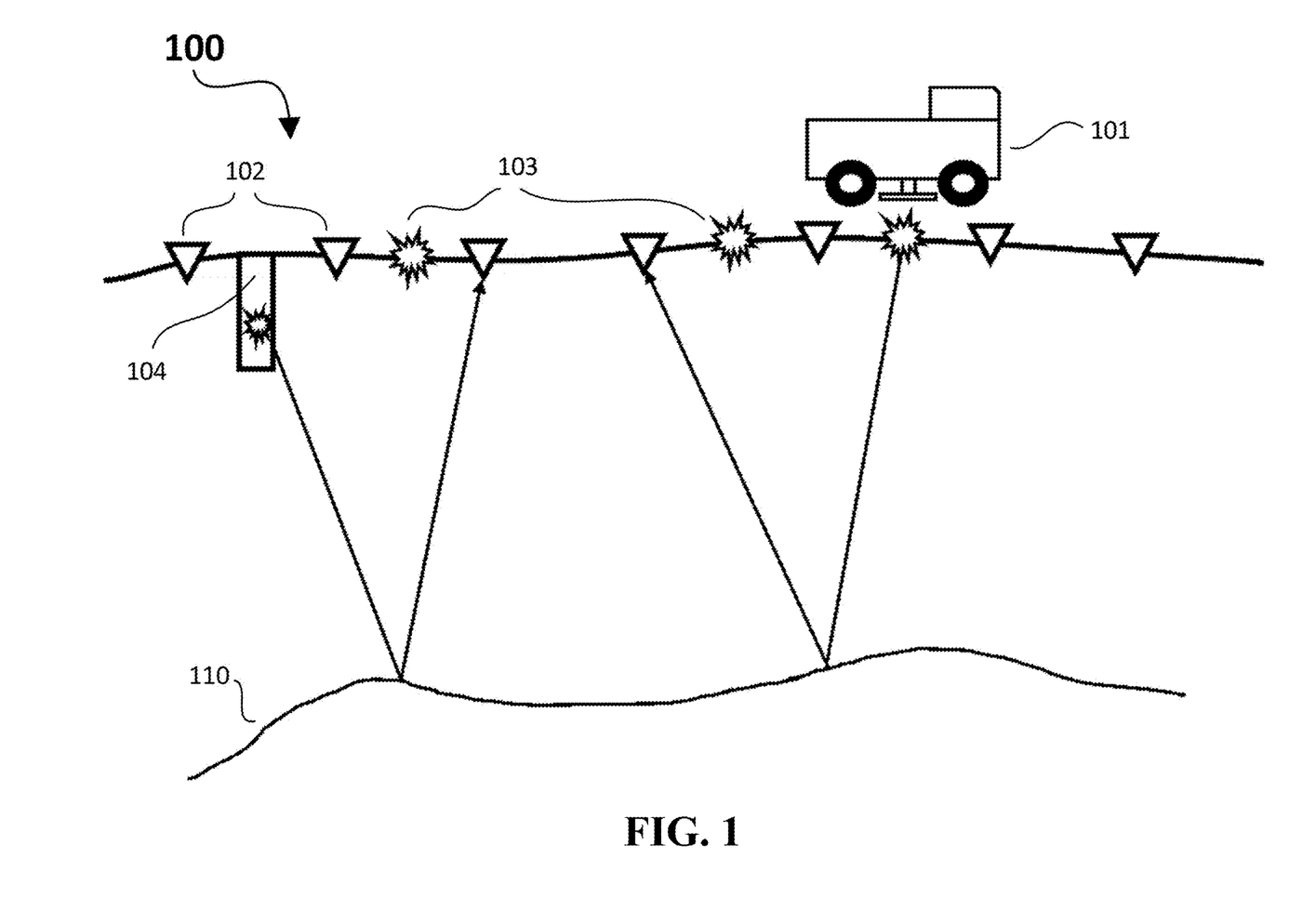
FIG. 1 is a schematic view of seismic survey equipment and procedure.

FIG. 1 provides a simplified, schematic illustration of a survey operation being performed by a survey tool, such as seismic truck 101 or an explosive source in a hole, to measure properties of the subterranean formation. The seismic truck may be equipped with a seismic vibrator and the explosive source can be a dynamite source, which produces a series of a sound vibrations 103.

Sound vibrations generated by source reflect off subsurface features, such as horizon 110. A set of sound vibrations is received by sensors, such as geophones 102 situated on the earth's surface. The geophones 102 forward data to a computer (not shown), which generates seismic data output. The computer can be located on the seismic truck 101 or another portable or stationary platform.

Seismic survey may also be conducted in a well 104 by deploying a modified wireline tool (not shown) into the wellbore. The modified wireline tool may have an explosive, radioactive, electrical, or acoustic energy source, which sends and/or receives signals into the surrounding subterranean formation. The wireline tool may be operatively connected to, for example, geophones 102 and a computer in the seismic truck 101 of FIG. 1. One of the unique advantages of seismic survey using the wireline tool is that the energy source may be deployed at various depths in the wellbore, which complements data collected by the surface geophones 102.

Figure 2:
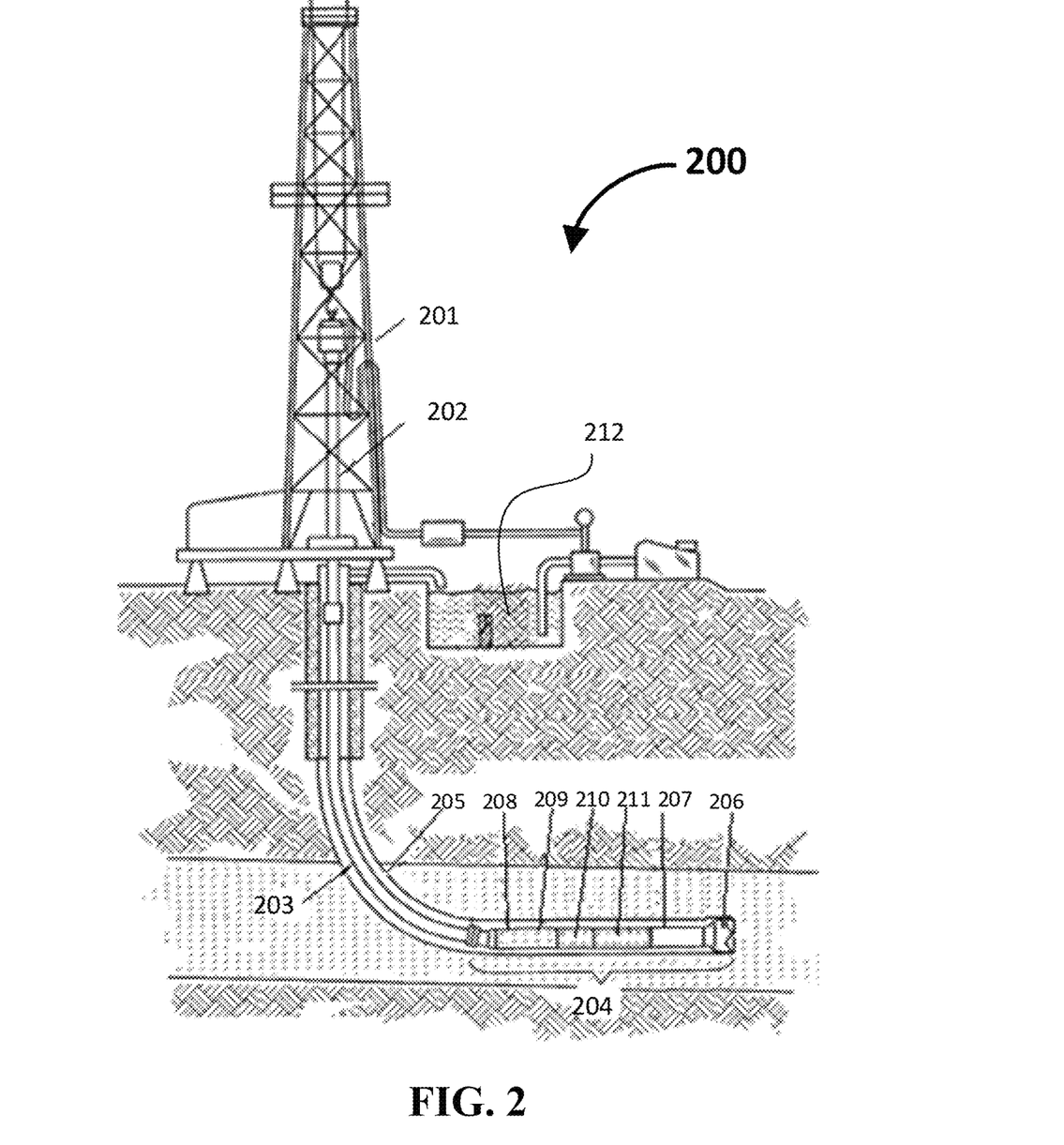
FIG. 2 is a schematic view of a drilling rig and its operations.

FIG. 2 is a schematic diagram showing an oil drilling system at a wellsite. In FIG. 2, the drilling system 200 has a derrick 201 erected above the surface, which is shown as land. However, the drilling system may be over any other surface such as water. A kelly 202 drives a drill string 203 into a borehole 205. The lower part of the drill string 203 is a bottom hole assembly (BHA) 204, which includes a non-magnetic drill collar 208 with a MWD system (MWD assembly) 209 installed therein, LWD instruments 210, a downhole motor 211, the near-bit measurement sub 207, the drill bit 206, etc.

During the drilling operation, the drilling system 200 may operate in the rotary mode, in which the drill string 203 is rotated from the surface either by the rotary table or a motor in the traveling block (i.e., a top drive). The drilling system 200 may also operate in a sliding mode, in which the drill string 203 is not rotated from the surface but is driven by the downhole motor 211 rotating the bit downhole. Drilling mud is pumped from the mud pit 212 through the drill string 203 to the drill bit 6, being injected into the annulus between the drill string 203 and the wall of the borehole 205. The drilling mud carries the cuttings up from the well to the surface.

In one or more embodiments, the MWD system (MWD assembly) 209 may include a pulser sub, a pulser driver sub, a battery sub, a central storage unit, a master board, a power supply sub, a directional module sub, and other sensor boards. In some embodiments, some of these devices may be located in other areas of the BHA 204.

The non-magnetic drill collar 208 has the MWD system 209, which includes a package of instruments for measuring inclination, azimuth, well trajectory, etc. Also included in the non-magnetic drill collar 208 or other locations in the drill string 203 are LWD instruments 210 such as a neutron-porosity measurement tool and a density measurement tool, which contains sensors that measure formation properties such as porosity and density. The instruments may be electrically or wirelessly coupled together, powered by a battery pack or a power generator driven by the drilling mud. All information gathered may be transmitted to the surface via a mud pulse telemetry system, electromagnetic transmission, or other communication system.

The measurement sub 207 may be disposed between the downhole motor 211 and drill bit 206, measuring formation resistivity, gamma ray, and the well trajectory using various sensors. The data may be transmitted through the cable embedded in the downhole motor 211 to MWD or other communication devices. The downhole motor 211 may be connected to a bent housing that is adjustable at the surface from 1° to 3°, preferably up to 4°. Due to the slight bend in the bent housing, the drill bit 206 can drill a curved trajectory.

Sensors are positioned in various other locations in the drilling system in addition to the drilling tool. The measure drilling parameters, such as weight on bit, torque on bit, pressures, temperatures, flow rates, compositions, rotary speed, and/or other parameters of the field operation. The data gathered by sensors are collected for analysis or other processing. The data may be collected in one or more databases and/or transmitted on or offsite. The data may be historical data, real time data, or combinations thereof. The real time data may be used in real time, or stored for later use. The data may also be combined with historical data or other inputs for further analysis. The data may be stored in separate databases, or combined into a single database.

A surface unit (not shown) may be positioned at the wellsite and/or at remote locations. It contains one or more computers as well as transceivers, which are used to communicate with the drilling tools and/or offsite operations, as well as with other surface or downhole sensors. For example, the surface unit may send commands to the drilling tools, and to receive data therefrom. It may also collect data generated during the drilling operation and produce data output, which may then be stored or transmitted on site in the surface unit or remotely. Based on the analysis, the surface unit may relay command or execute command to one or more controller for actuating mechanisms in the drilling system, such as controlling drilling direction, weight on bit, pump rates, or other parameters. These adjustments may be made automatically based on computer protocol, and/or manually by an operator.

While FIGS. 1 and 2 illustrate seismic survey and drilling in an oilfield on land, the same principles and similar tools of seismic survey and oil exploration may be applicable to underwater oilfields. Also, while FIGS. 1 and 2 show a single oilfield measured at a single location, oilfield applications may be utilized with any combination of one or more oilfields, one or more processing facilities and one or more wellsites.

The seismic image created according to one embodiments in this disclosure have more accurately identify the hydrocarbon trap in the subsurface for the drilling success described in FIG. 2. Therefore, in an embodiment of the current disclosure, to further improve migration image by attenuation of noises and enhancement of signals, a total variation (TV) regularization is adopted to handle the ill-posed nature of the inverse problem. Meanwhile, a structure tensor-based regularization is also used to reduce noise and oscillation artifacts in each iteration. As such, the method according to one of the embodiments in this disclosure uses structure tensor guided total variation regularization in migration rather than the traditional direct inversion of model m by the least squares inversion.

The new inversion equation is expressed as the following:

$$J=\|Gm-d\|^2+\frac{1}{2}\|TV(m)\|p+\frac{1}{2}\|STS(m)\|p \quad (3),$$

wherein $\|\cdot\|$ represents L2 norm, d is the received seismic data, and p is a norm that ranges from 1 to 2.

As shown in Equation (3), instead of using damping operator C or Tikonov regularization, the objective function incorporates two regularization terms—TV(m) is total variation regularization operator while STS(m) is structure tensor regularization. The TV operator reduces the sensitivity of inversion algorithm to the initial model and data noise, which makes algorithm be more robust. The STS term plays a role in making the inverted model toward a sound geologic structure. In other words, the STS operator benefits the algorithm by creating more reasonable and reliable models in a geologic sense.

Both regularization terms can be calculated using $$\nabla TV(m) = -\nabla \cdot \left(\frac{\nabla m}{|\nabla m|}\right), \text{ and} \quad (4)$$

$$\nabla STS(m) = div(H\nabla m), \quad (5)$$

in which H is a structure tensor based diffusion function while div is divergence operator. The final iteration inversion gives a more reliable m having attenuated seismic image distortion.

Figure 3:
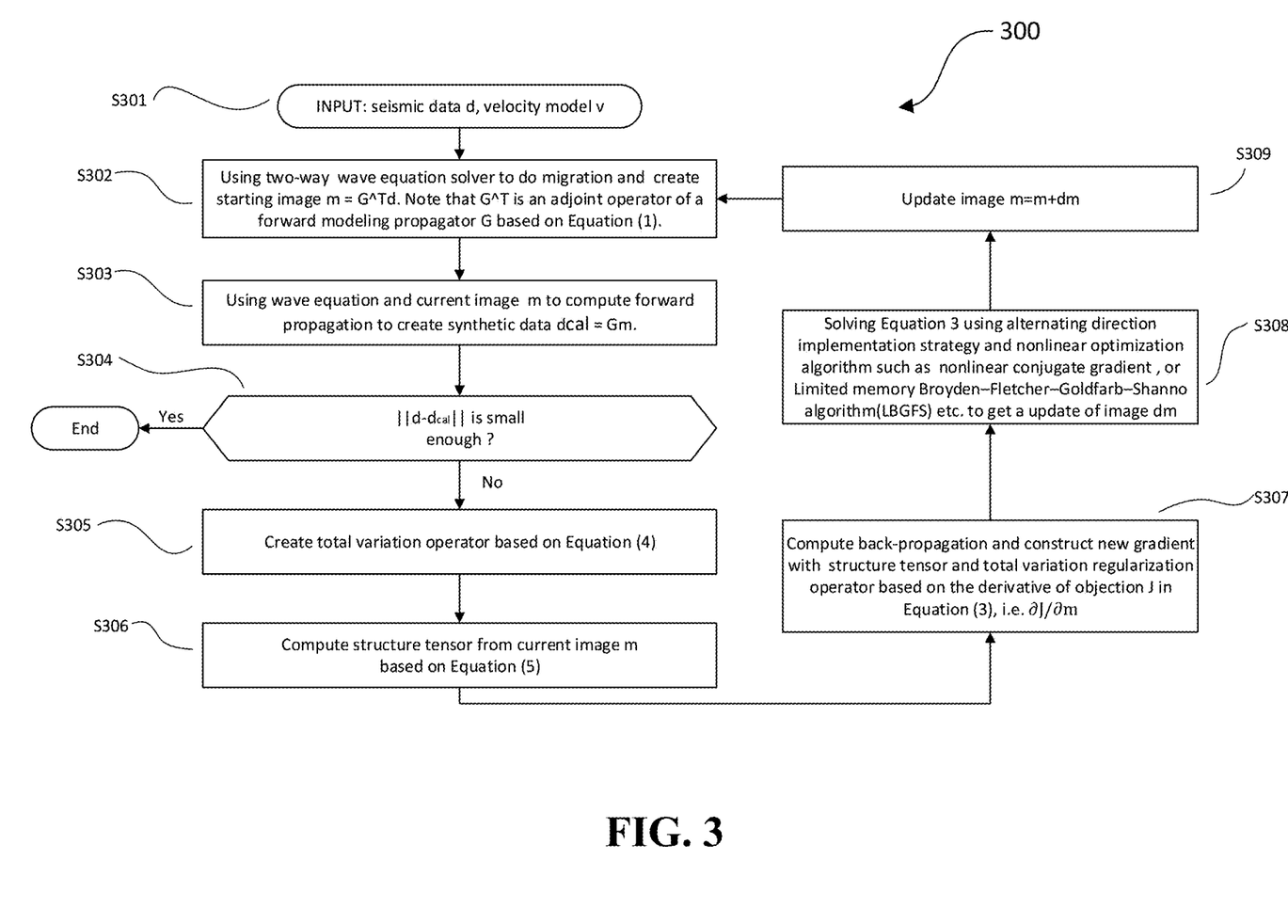
FIG. 3 illustrates a flowchart of a method of seismic processing according to an embodiment in this disclosure.

FIG. 3 shows a process 300 for solving Equation (4). In step S301, seismic data d collected from seismic survey and velocity model v are used as the input to the model. In step S302, the image volume of seismic data is created using a two-way acoustic wave equation solver to perform migration in time or in depth to obtain a starting image model m=G^Td. Note that G^T is an adjoint operator of a forward modeling propagator G based on Equation (1).

Step S303 calculates forward propagation based on the two-way acoustic wave equation to create subsurface media response or synthetic data $d_{cal}$ using current image model m, i.e., $d_{cal}$=Gm. Step S304 checks whether the calculated data $d_{cal}$ fits well with collected data d by computing their residuals. If the residual between d and $d_{cal}$ is smaller than a predetermined value, the current model m is considered sound and no more iteration is needed. The process ends and the final output is model m. Otherwise, the iteration continues so that the model is updated. In the new iteration, S305 constructs total variation regularization operator based on Equation (4) as the first term of regularization. In Step S306, structure tensor regularization term is computed based on Equation (5). The benefits of using both of these constrains—total variation regularization operator VT as well as structure tensor STS—is that the output noise-attenuated and at the same time maintain a more sensible geologic structure, i.e., the geologic structure is preserved.

Step S307 implements wavefield back-propagation g=G^Td with structure tensor and total variation regularization based on the derivative of objection J in Equation (3). Step S308 obtains the update of image dm by solving Equation (3) using alternating direction implementation strategy and nonlinear optimization algorithm such as nonlinear conjugate gradient or Limited memory Broyden-Fletcher-Goldfarb-Shanno algorithm (LBGFS), etc. Step S309 updates current model and create the updated image model m=m+dm. The updated image model m is used in step S303 for further iteration.

Figure 4:
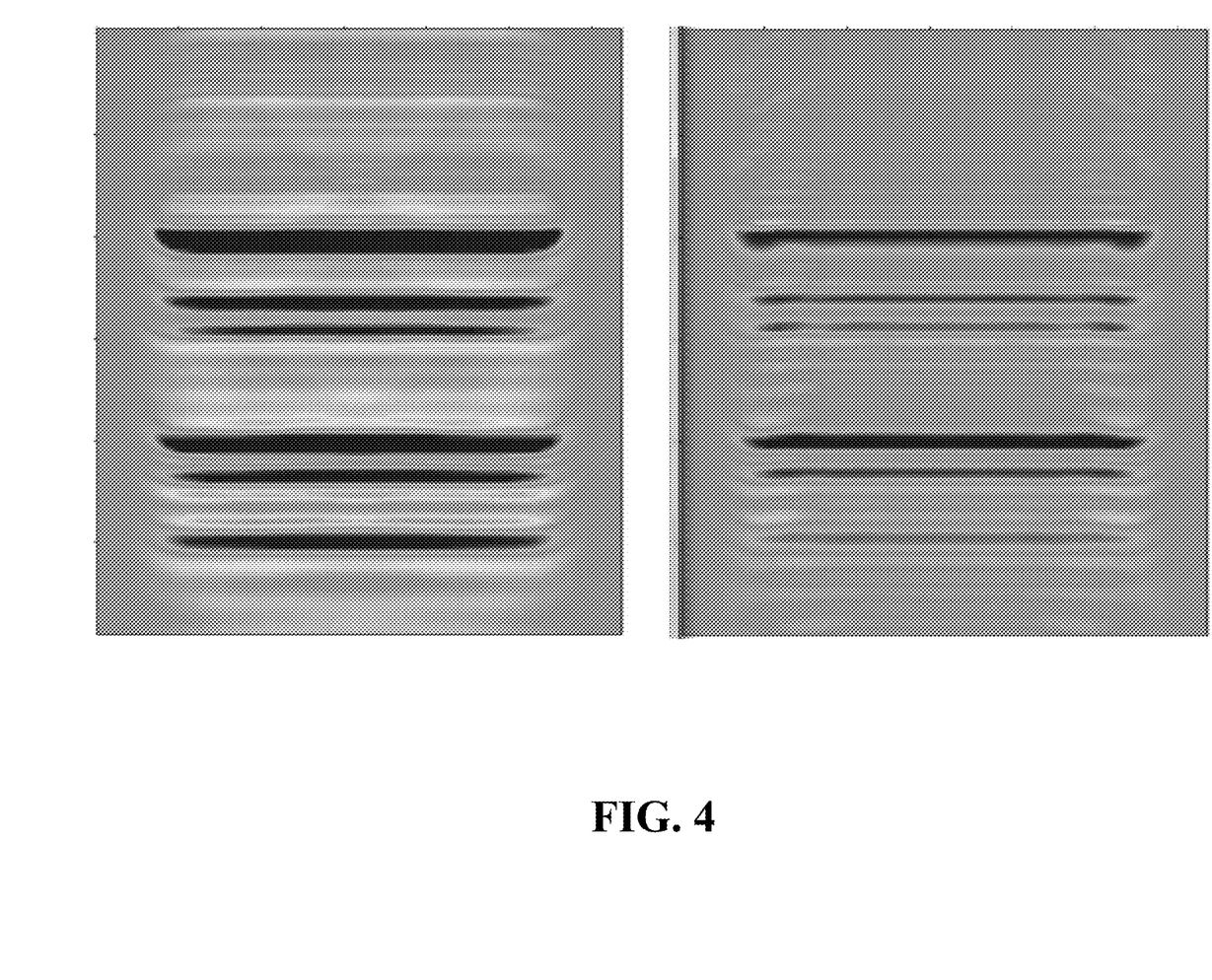
FIG. 4 compares a migration seismic image using two-way acoustic wave equation migration (left panel) with an improved seismic image obtained according to an embodiment in this disclosure (right panel).

In FIG. 4, the left panel shows an exemplary seismic image using synthetic data with only damping regularization applied using two-way acoustic wave equation. The right panel shows the seismic image processed using the method of current disclosure, i.e., applying both total variation regularization and structure tensor. Compared with the left panel, the image in the right panel show improvements in resolution and noise attenuation.

Figure 5:
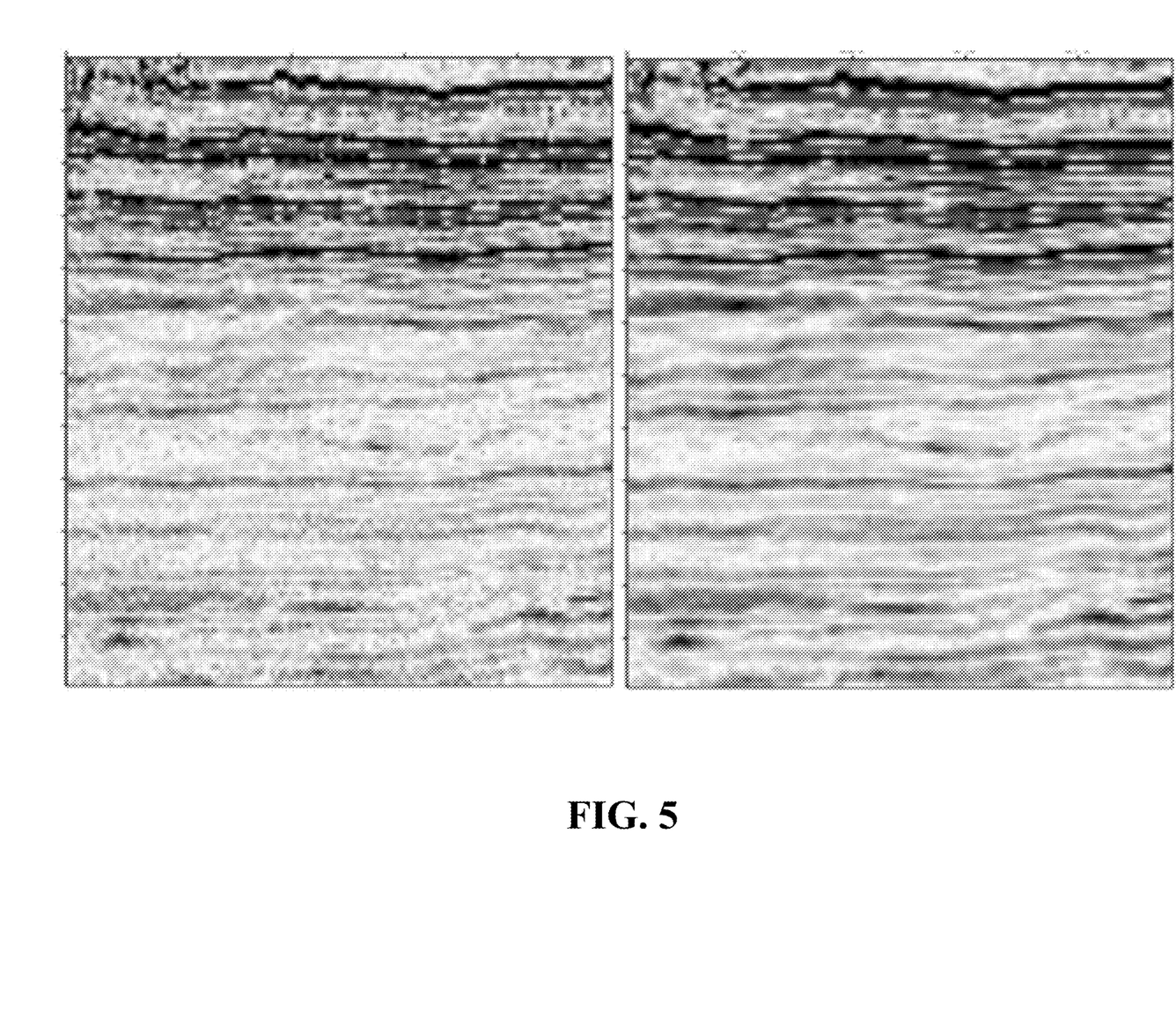
FIG. 5 compares another field data seismic migration image using two-way acoustic wave equation migration (left panel) with an improved seismic image obtained according to an embodiment in this disclosure (right panel).

Likewise, in FIG. 5, the left panel shows a field seismic data migration image using a two-way acoustic wave equation based reverse time migration (RTM) method with only total variation regularization while the right panel shows a seismic image obtained using the same set of input data but with the method of current disclosure. The image in the right panel shows better resolution and noise attenuation.

In some embodiments, any of the methods described herein may be executed by a computing system. The computing system may include a computer or computer system, which may be an individual computer system or a plurality of distributed computer systems. The computer system includes one or more analysis module(s) configured to perform various tasks according to some embodiments, such as one or more methods disclosed herein. To perform these various tasks, the analysis module executes independently, or in coordination with, one or more processors, which is (or are) connected to one or more storage media.

The processor can include a microprocessor, microcontroller, processor module or subsystem, programmable integrated circuit, programmable gate array, or another control or computing device. The processor may be connected to a network interface to allow the computer system to communicate over a data network with one or more additional computer systems and/or computing systems.

The storage media may be implemented as one or more computer-readable or machine-readable storage media. The storage media may be within a computer system that is located in one facility but can also be distributed in multiple facilities, including in the cloud. Storage media may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories, magnetic disks such as fixed, floppy and removable disks, other magnetic media including tape, optical media such as compact disks (CDs) or digital video disks (DVDs), BLURAY® disks, or other types of optical storage, or other types of storage devices. The instructions discussed above may be provided on one computer-readable or machine-readable storage medium, or alternatively, may be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

It should be noted that the steps in the methods disclosed herein may be implemented by running one or more functional modules in information processing apparatus such as general purpose processors or application specific chips, such as ASICs, FPGAs, PLDs, or other appropriate devices. These modules, combinations of these modules, and/or their combination with general hardware are all included within the scope of protection of the invention.

Geologic interpretations, models and/or other interpretation aids may be refined in an iterative fashion; this concept is applicable to methods discussed herein. This can include use of feedback loops executed on an algorithmic basis, such as at a computing device, and/or through manual control by a user who may make determinations regarding whether a given step, action, template, model, or set of curves has become sufficiently accurate for the evaluation of the subsurface three-dimensional geologic formation under consideration.

While in the foregoing specification this disclosure has been described in relation to certain preferred embodiments thereof, and many details have been set forth for purpose of illustration, it will be apparent to those skilled in the art that the disclosure is susceptible to alteration and that certain other details described herein can vary considerably without departing from the basic principles of the disclosure. In addition, it should be appreciated that structural features or method steps shown or described in any one embodiment herein can be used in other embodiments as well.

What is claimed is:

1. A method for seismic processing, comprising:
    positioning a plurality of seismic receivers at different locations in a survey region;
    generating seismic vibrations in a subterranean area of the survey region using seismic sources positioned in the subterranean area;
    receiving seismic data acquired from the plurality of seismic receivers based on the seismic vibrations in the subterranean area generated by the seismic sources;
    creating an image model by migration in time or in depth using a two-way acoustic wave equation from the seismic data; and
    updating the image model,
    wherein the step of updating the image model further comprises the substeps of:
        calculating forward wave propagation using the two-way acoustic wave equation to create synthetic data using a current image model;
        comparing the synthetic data and the received seismic data;
        when a difference between the synthetic data and the received seismic data exceeds a pre-determined value, calculating a total variation regularization operator and a structure tensor regularization operator using the current image model;
        computing wavefield back-propagation and constructing a new gradient with the calculated structure tensor operator and the total variation regularization operator; and
        obtaining an update of the current image model,
    wherein the total variation regularization operator is $$\nabla TV(m) = -\nabla \cdot \left(\frac{\nabla m}{|\nabla m|}\right),$$

m is the current image model,
    wherein the structure tensor regularization operation is $\nabla STS(m)=\text{div}(H\nabla m)$, H is a structure tensor based diffusion function and div is divergence operator,
    wherein the substep of computing wavefield back-propagation and constructing a new gradient with the calculated structure tensor operator and the total variation regularization operator is performed by calculating a derivative of $$\frac{\partial J}{\partial m},$$

$J=\|Gm-d\|^2+\frac{1}{2}\|TV(m)\|p+\frac{1}{2}\|STS(m)\|p$, and
    wherein $\|\cdot\|$ represents L2 norm, d is the received seismic data, and p is a norm that ranges from 1 to 2.

2. The method of claim 1, wherein the substep of obtaining an update of the current image model is obtained by solving the equation $$J=\|Gm-d\|^2+\tfrac{1}{2}\|TV(m)\|p+\tfrac{1}{2}\|STS(m)\|p.$$

3. The method of claim 1, wherein the positioning of the plurality of seismic receivers at different locations in the survey region including positioning one or more sensors in the wellbore.

4. A computing apparatus, comprising:
    one or more processors; and
    a memory system comprising one or more non-transitory, computer-readable media storing instructions that, when executed by at least one of the one or more processors, cause the computing system to perform operations, the operations comprising:
    receiving seismic data acquired from a plurality of seismic receivers in response to seismic vibrations generated by a plurality of seismic sources positioned in a subterranean area;
    creating an image model by migration in time or in depth using a two-way acoustic wave equation from the seismic data; and updating the image model,
wherein the step of updating the image model further comprises the substeps of:
calculating forward wave propagation using the two-way acoustic wave equation to create synthetic data using a current image model;
comparing the synthetic data and the received seismic data;
when a difference between the synthetic data and the received seismic data exceeds a pre-determined value, calculating a total variation regularization operator and a structure tensor regularization operator using the current image model;
computing wavefield back-propagation and constructing a new gradient with the calculated structure tensor operator and the total variation regularization operator; and
obtaining an update of the current image model,
wherein the total variation regularization operator is $$\nabla TV(m) = -\nabla \cdot \left(\frac{\nabla m}{|\nabla m|}\right),$$

m is the current image model,
wherein the structure tensor regularization operation is $\nabla STS(m)=div(H\nabla m)$, H is a structure tensor based diffusion function and div is divergence operator,
wherein the substep of computing wavefield back-propagation and constructing a new gradient with the calculated structure tensor operator and the total variation regularization operator is performed by calculating a derivative of $$\frac{\partial J}{\partial m},$$

$J=\|Gm-d\|^2+\frac{1}{2}\|TV(m)\|p+\frac{1}{2}\|STS(m)\|p$, and wherein $\|\cdot\|$ represents L2 norm, d is the received seismic data, and p is a norm that ranges from 1 to 2.

5. The computing apparatus of claim 4, wherein the sub step of obtaining an update of the current image model is carried out by solving the equation $J=\|Gm-d\|^2+\frac{1}{2}\|TV(m)\|p+\frac{1}{2}\|STS(m)\|p$.

6. A non-transitory, computer-readable medium storing instructions that, when executed by at least one processor of a computing apparatus, cause the computing system to perform operations, the operations comprising:
receiving seismic data acquired from a plurality of seismic receivers in response to seismic vibrations generated by a plurality of seismic sources positioned in a subterranean area;
creating an image model by migration in time or in depth using a two-way acoustic wave equation from the seismic data; and
updating the image model,
wherein the step of updating the image model further comprises the substeps of:
calculating forward wave propagation using the two-way acoustic wave equation to create synthetic data using a current image model;
comparing the synthetic data and the received seismic data;
when a difference between the synthetic data and the received seismic data exceeds a pre-determined value, calculating a total variation regularization operator and a structure tensor regularization operator using the current image model;
computing wavefield back-propagation and constructing a new gradient with the calculated structure tensor operator and the total variation regularization operator; and
obtaining an update of the current image model,
wherein the total variation regularization operator is $$\nabla TV(m) = -\nabla \cdot \left(\frac{\nabla m}{|\nabla m|}\right),$$

m is me current image model,
wherein the structure tensor regularization operation is $\nabla STS(m)=div(H\nabla m)$, H is a structure tensor based diffusion function and div is divergence operator,
wherein the substep of computing wavefield back-propagation and constructing a new gradient with the calculated structure tensor operator and the total variation regularization operator is performed by calculating a derivative of $$\frac{\partial J}{\partial m},$$

$J=\|Gm-d\|^2+\frac{1}{2}\|TV(m)\|p+\frac{1}{2}\|STS(m)\|p$, and wherein $\|\cdot\|$ represents L2 norm, d is the received seismic data, and p is a norm that ranges from 1 to 2.

7. The medium of claim 6, wherein the substep of obtaining an update of the current image model is carried out by solving the equation $J=\|Gm-d\|^2+\frac{1}{2}\|TV(m)\|p+\frac{1}{2}\|STS(m)\|p$.

* * * * *